United States Patent
Li et al.

(10) Patent No.: US 11,432,231 B2
(45) Date of Patent: Aug. 30, 2022

(54) AC BARRING METHODS AND APPARATUSES

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/105,923

(22) Filed: Nov. 27, 2020

(65) Prior Publication Data

US 2021/0084573 A1 Mar. 18, 2021

Related U.S. Application Data

(63) Continuation of application No. PCT/CN2018/089400, filed on May 31, 2018.

(51) Int. Cl.
| | | |
|---|---|---|
| *H04W 48/08* | (2009.01) | |
| *H04W 48/02* | (2009.01) | |
| *H04W 48/14* | (2009.01) | |
| *H04W 76/25* | (2018.01) | |
| *H04W 76/19* | (2018.01) | |
| *H04W 76/27* | (2018.01) | |
| *H04W 68/00* | (2009.01) | |

(52) U.S. Cl.
CPC ......... *H04W 48/14* (2013.01); *H04W 68/005* (2013.01); *H04W 76/19* (2018.02); *H04W 76/25* (2018.02); *H04W 76/27* (2018.02)

(58) Field of Classification Search
None
See application file for complete search history.

(56) References Cited

U.S. PATENT DOCUMENTS

| | | |
|---|---|---|
| 9,155,105 B2 | 10/2015 | Hsu |
| 9,237,557 B2 | 1/2016 | Lee et al. |
| 9,949,271 B2 | 4/2018 | Hsu et al. |
| 2013/0242955 A1 | 9/2013 | Fan et al. |
| 2017/0070974 A1 | 3/2017 | Fan et al. |
| 2019/0357119 A1* | 11/2019 | Hong ............ H04W 48/08 |

FOREIGN PATENT DOCUMENTS

| | | |
|---|---|---|
| CN | 101547492 A | 9/2009 |
| CN | 101610609 A | 12/2009 |
| CN | 101647302 A | 2/2010 |
| CN | 102740374 A | 10/2012 |
| CN | 103139866 A | 6/2013 |
| CN | 104380804 A | 2/2015 |

(Continued)

OTHER PUBLICATIONS

European Patent Office, Notification for Correction Issued in Application No. 18921257.4, May 20, 2021, Germany, 2 pages.

(Continued)

*Primary Examiner* — Gary Lafontant
(74) *Attorney, Agent, or Firm* — Syncoda LLC; Feng Ma

(57) ABSTRACT

An Access Class (AC) barring method can be applied to a terminal and include: detecting that at least one of a non-access stratum (NAS) triggered event and an access stratum (AS) triggered event; and performing AC barring check on at least one of the NAS triggered event and the AS triggered event.

7 Claims, 8 Drawing Sheets

---

Detect events simultaneously triggered by NAS and AS — 110

Perform AC barring check on the NAS trigger event and/or the AS trigger event — 120

(56) References Cited

FOREIGN PATENT DOCUMENTS

| | | |
|---|---|---|
| CN | 105850188 A | 8/2016 |
| JP | 2014216755 A | 11/2014 |
| RU | 2610422 C2 | 2/2017 |

OTHER PUBLICATIONS

ISA State Intellectual Property Office of the People's Republic of China, Written Opinion of the International Searching Authority Issued in Application No. PCT/CN2018/089400, dated Feb. 15, 2019, WIPO, 8 pages.

European Patent Office, Extended European Search Report Issued in Application No. 18921257.4, dated Oct. 6, 2021, Germany, 48 pages.

Intellectual property India, Office Action Issued in Application No. 202047056723, dated Sep. 17, 2021, 8 pages.

Korean Intellectual Property Office, Office Action Issued in Application No. 10-2020-7037522, dated Sep. 24, 2021, 5 pages.

ZTE, Sanechips, "Further consideration on AS/NAS modeling for unified access control", 3GPP TSG-RAN WG2 Meeting#101 bis Sanya, China, R2-1804451, Apr. 16-20, 2018, 3 pages.

LG Electronics Inc. "UAC for AS triggered events", 3GPP TSG-RAN WG2 #102 Busan, Republic of Korea, R2-1808595, Resubmission of R2-1805939, May 21-25, 2018, 3 pages.

Xiaomi, "Further Considerations on Access Control in NR", 3GPP TSG-RAN2 #101bis Sanya, China, R2-1804645, Apr. 16-20, 2018, 4 pages.

Ericsson, "Access Control in RRC Connected", 3GPP TSG-RAN WG2#102 Busan, Republic of Korea, Tdoc R2-1806757, (resubmission of R2-1804711), May 21-25, 2018, 4 pages.

Ericsson, "Uplink data triggered RRC resume", 3GPP TSG-RAN WG2 #102 Busan, Republic of Korea,R2-1806761, May 21-25, 2018, 9 pages.

LG Electronics Inc. "UAC for RNA Update", 3GPP TSG-RAN WG2 #101 Bis Sanya, China, R2-1805939, Apr. 16-20, 2018, 3 pages.

Lenovo, Motorola Mobility,"23.501: RAN paging failure handling update", SA WG2 Meeting #123 Ljubljana,Slovenia, S2-177541, Oct. 23-27, 2017, 3 pages.

State Intellectual Property Office of the People's Republic of China, Office Action and Search Report Issued in Application No. 2018800007416, dated Apr. 11, 2019, 18 pages, (Submitted with Machine Translation).

State Intellectual Property Office of the People's Republic of China, Office Action and Search Report Issued in Application No. 2018800007416, dated Jun. 27, 2019, 12 pages, (Submitted with Machine Translation).

State Intellectual Property Office of the People's Republic of China, Office Action and Search Report Issued in Application No. 2018800007416, dated Sep. 25, 2019, 10 pages,(SubmittedwithMachineTranslation).

ISA State Intellectual Property Office of the People's Republic of China, International Search Report Issued in Application No. PCT/CN2018/089400, dated Feb. 15, 2019, WIPO, 4 pages.

Xiaomi Communications,"Further Considerations on AS triggered events", 3GPP TSG-RAN2 #102, Busan, Korea, R2-1807717, May 21-25, 2018, 3 page.

Japanese Patent Office Action, Office Action Issued in Application No. 2020-566896, dated Feb. 15, 2022, 19 pages.

Korean Intellectual Property Office, Office Action Issued in Application No. 10-2020-7037522, dated Mar. 3, 2022, 10 pages.

LG Electronics Inc."Handling of Timers in UAC", 3GPP TSG-RAN WG2 #102, R2-1808594, Resubmission of R2-1805938, Busan, Republic of Korea, May 21-25, 2018, 2 pages.

Huawei, HiSilicon, "Access control signaling design", 3GPP TSG-RAN2 Meeting #102, R2-1808704, revision of R2-1805843, Sanya, China, Apr. 16-20, 2018, 3 pages.

\* cited by examiner

AC BARRING METHODS AND APPARATUSES

CROSS-REFERENCE TO RELATED APPLICATIONS

This application is a continuation of International Application No. PCT/CN2018/089400 filed on May 31, 2018, the disclosure of which is hereby incorporated by reference in its entirety.

BACKGROUND

In a long-term evolution (LTE) communication system, the working mechanism of Access Class (AC) barring is: according to an access class of a terminal and a call type initiated by the terminal, a corresponding AC barring parameter is acquired, and an AC barring check is performed accordingly.

In new radio (NR) communication system, a unified mechanism of AC barring is introduced. Moreover, the unified AC barring mechanism may be applied on a terminal in an idle or inactive state, and may also be applied on a terminal in a connected state.

SUMMARY

Various embodiments of the present disclosure provide AC barring methods and apparatuses.

According to a first aspect of the embodiments of the present disclosure, an AC barring method is provided, the method is applicable to a terminal and includes:

detecting at least one of a non-access stratum (NAS) event and an access stratum (AS) event; and performing AC barring check on the at least one of the NAS triggered event and the AS triggered event.

In some embodiments, the AS triggered event is radio access network (RAN) paging.

In some embodiments, performing AC barring check on at least one of the NAS triggered event and the AS triggered event includes at least one of the following:

performing AC barring check on both the NAS triggered event and the RAN paging;

in response to that AC barring check is performed on the NAS triggered event and detecting that the terminal enters a connected state, performing AC barring check on the RAN paging;

performing AC barring check only on the RAN paging; and performing AC barring check only on the NAS triggered event.

In some embodiments, performing AC barring check on both the NAS triggered event and the RAN paging includes:

in response to determining that the NAS triggered event is subjected to AC barring, for the RAN paging, executing a resume process triggered by the RAN paging;

for the NAS triggered event, starting an AC barring timer corresponding to the NAS triggered event; and in response to detecting that the AC barring timer is expired, performing AC barring check on the NAS triggered event again.

In some embodiments, the AC barring timer is not restarted after the RAN paging triggers the terminal to enter the connected state or to be in an inactive state.

In some embodiments, the AC barring timer is reset or restarted after the RAN paging triggers the terminal to enter the connected state or to be in an inactive state.

In some embodiments, in response to detecting that the AC barring timer is expired, performing AC barring check on the NAS triggered event includes:

in response to determining that the terminal is in an inactive state, performing AC barring check on the NAS triggered event with a first AC barring parameter, wherein the first AC barring parameter is a parameter configured for the terminal to use in the inactive state; and in response to determining that the terminal enters the connected state, performing AC barring check with the first AC barring parameter or a second AC barring parameter, wherein the second AC barring parameter is a parameter configured for the terminal to use in the connected state.

In some embodiments, performing AC barring check with the first AC barring parameter or the second AC barring parameter includes:

in response to receiving the second AC barring parameter from a base station, performing AC barring check with the second AC barring parameter; and in response to not receiving the second AC barring parameter from the base station, performing AC barring check with the first AC barring parameter.

In some embodiments, performing AC barring check with the first AC barring parameter or the second AC barring parameter includes:

in response to receiving, from a base station, indication information which instructs the terminal to use the second AC barring parameter, performing AC barring check with the second AC barring parameter based on the indication information; and in response to not receiving the indication information from the base station, performing AC barring check with the first AC barring parameter.

In some embodiments, performing AC barring check on both the NAS triggered event and the RAN paging includes:

in response to determining that the NAS triggered event is not subjected to AC barring, for the RAN paging, executing a resume process triggered by the RAN paging; and for the NAS triggered event, adding a NAS message to a designated message triggered by the RAN paging, and sending the designated message to a base station.

In some embodiments, the designated message is a radio resource control (RRC) message during the resume process triggered by the RAN paging, or an uplink message from the terminal when the terminal is triggered to enter the connected state by the RAN paging.

In some embodiments, in response to that AC barring check is performed on the NAS triggered event and detecting that the terminal enters a connected state, performing AC barring check on the RAN paging includes:

obtaining an AC barring check result from performing AC barring check on the NAS triggered event;

in response to that the AC barring check result indicates an approval and detecting that the terminal enters the connected state, performing data transmission triggered by the RAN paging in the connected state without performing AC barring check on the RAN paging; and in response to that the AC barring check result indicates a rejection, performing AC barring check on the RAN paging, wherein an RRC message during a resume process triggered by the RAN paging is configured to be uncapable of carrying a NAS message.

In some embodiments, performing AC barring check only on the RAN paging includes:

allowing for executing a resume process triggered by the RAN paging, wherein an RRC message during the resume process is configured to be capable of carrying a NAS message.

In some embodiments, performing AC barring check only on the NAS triggered event includes:

in response to that the NAS triggered event is subject to AC barring and a resume process triggered by the RAN paging is not executed, responding to a release initiated by the network or other RAN paging initiated by the network again.

In some embodiments, the NAS triggered event is core network (CN) paging, performing AC barring check on at least one of the NAS triggered event and the AS triggered event includes:

performing AC barring check only on the CN paging.

According to a second aspect of the embodiments of the present disclosure, an AC barring apparatus is provided, the method is applicable to a terminal and includes:

a detecting module, configured to detect events simultaneously triggered by NAS and AS; and an AC barring module, configured to perform AC barring check on the NAS triggered event and/or the AS triggered event.

In some embodiments, the AS triggered event is RAN paging.

In some embodiments, the AC barring module comprises at least one of the following:

a first AC barring sub-module, configured to perform AC barring check on both the NAS triggered event and the RAN paging;

a second AC barring sub-module, configured to, in response to that AC barring check is performed on the NAS triggered event and detecting that the terminal enters a connected state, perform AC barring check on the RAN paging;

a third AC barring sub-module, configured to perform AC barring check only on the RAN paging but not on the NAS triggered event; and a fourth AC barring sub-module, configured to perform AC barring check only on the NAS triggered event but not on the RAN paging.

In some embodiments, the first AC barring sub-module includes:

a first execution sub-module, configured to in response to determining that the NAS triggered event is subjected to AC barring, for the RAN paging, execute a resume process triggered by the RAN paging;

a starting sub-module, configured to for the NAS triggered event, start an AC barring timer corresponding to the NAS triggered event; and a first checking sub-module, configured to in response to detecting that the AC barring timer is expired, perform AC barring check on the NAS triggered event again.

In some embodiments, the AC barring timer is not restarted after the RAN paging triggers the terminal to enter the connected state or to be in the inactive state.

In some embodiments, the AC barring timer is reset or restarted after the RAN paging triggers the terminal to enter the connected state or to be in the inactive state.

In some embodiments, the first checking sub-module includes:

a second checking sub-module, configured to in response to determining that the terminal is in an inactive state, perform AC barring check on the NAS triggered event with a first AC barring parameter, wherein the first AC barring parameter is a parameter configured for the terminal to use in the inactive state; and a third checking sub-module, configured to in response to determining that the terminal enters the connected state, perform AC barring check with the first AC barring parameter or a second AC barring parameter, wherein the second AC barring parameter is a parameter configured for the terminal to use in the connected state.

In some embodiments, the third checking sub-module includes:

a first processing sub-module, configured to in response to receiving the second AC barring parameter from a base station, perform the AC barring check with the second AC barring parameter; and a second processing sub-module, configured to in response to not receiving the second AC barring parameter from the base station, perform the AC barring check with the first AC barring parameter.

In some embodiments, the third checking sub-module includes:

a third processing sub-module, configured to in response to receiving, from a base station, indication information which instructs the terminal to use the second AC barring parameter, perform AC barring check with the second AC barring parameter based on the indication information; and a fourth processing sub-module, configured to in response to not receiving the indication information from the base station, perform AC barring check with the first AC barring parameter.

In some embodiments, the first AC barring sub-module includes:

a second execution sub-module, configured to in response to determining that the NAS triggered event is not subjected to AC barring, for the RAN paging, executing a resume process triggered by the RAN paging; and an adding sub-module, configured to, for the NAS triggered event, add a NAS message to a designated message triggered by the RAN paging, and send the designated message to the base station.

In some embodiments, the designated message is an RRC message during the resume process triggered by the RAN paging, or an uplink message from the terminal when the terminal is triggered to enter the connected state by the RAN paging.

In some embodiments, the second AC barring sub-module includes:

a check result determining sub-module, configured to obtain an AC barring check result from performing AC barring check on the NAS triggered event;

a fifth processing sub-module, configured to in response to that the AC barring check result indicates an approval and detecting that the terminal enters the connected state, perform data transmission triggered by the RAN paging in the connected state without performing AC barring on the RAN paging; and a sixth processing sub-module, configured to in response to that the AC barring check result indicates a rejection, perform AC barring on the RAN paging, wherein an RRC message during a resume process triggered by the RAN paging is configured to be uncapable of carrying a NAS message.

In some embodiments, the third AC barring sub-module includes:

a seventh processing sub-module, configured to execute a resume process triggered by the RAN paging, wherein an RRC message during the resume process is configured to be capable of carrying a NAS message.

In some embodiments, the fourth AC barring sub-module includes:

an eighth processing sub-module, configured to in response to that the NAS triggered event is subject to AC barring and a resume process triggered by the RAN paging is not executed, respond to a release initiated by the network or other RAN paging initiated by the network again.

In some embodiments, the NAS trigger event is CN paging; the AC barring module includes:

a fifth AC baring sub-module, configured to perform AC barring check only on the CN paging.

According to a third aspect of the embodiments of the present disclosure, a non-transitory computer readable storage medium storing computer program is provided, the computer program is configured to execute the AC barring method from the first aspect.

According to a fourth aspect of the embodiments of the present disclosure, an AC barring apparatus is provided. The apparatus is applicable to a terminal and includes:

a processor;

memory for storing executable instructions by the processor;

wherein, the processor is configured to:

detect events simultaneously triggered by NAS and AS;

perform an AC barring on the NAS trigger event and/or the AS trigger event.

It should be understood that the above general description and the following detailed description are only exemplary and explanatory, and are not restrictive of the present disclosure.

BRIEF DESCRIPTION OF THE DRAWINGS

The accompanying drawings, which are incorporated in and constitute a part of the present disclosure, illustrate examples consistent with the present disclosure and, together with the description, serve to explain the principles of the disclosure.

DETAILED DESCRIPTION

Figure 1:
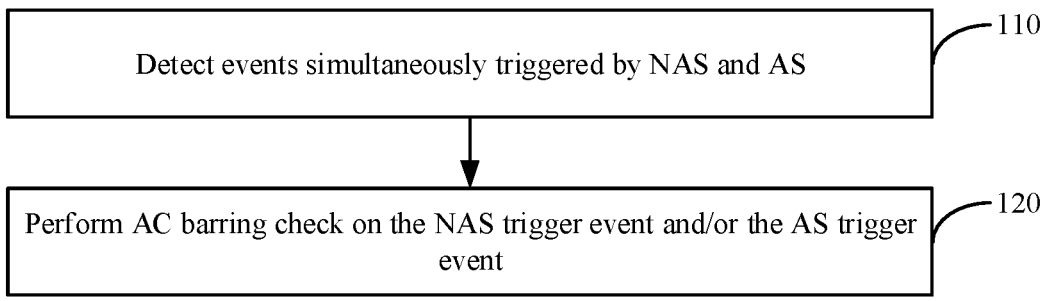
FIG. 1 is a flowchart illustrating an AC barring method according to some embodiments of the present disclosure.

Embodiments will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

For an NR communication system, an event triggered by a non-access stratum (NAS) of a terminal and an event triggered by an access stratum (AS) of the terminal may coexist and the events may be referred to as concurrent events, but there is no technical solution for performing AC barring on the concurrent events.

Figure 2:
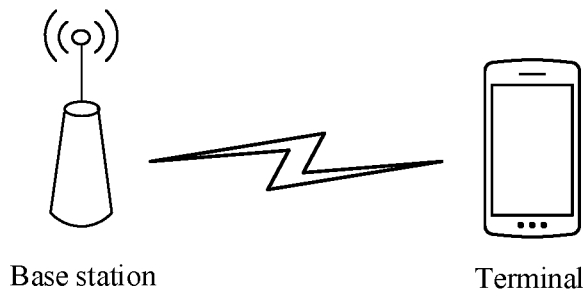
FIG. 2 is an application scene illustrating an AC barring method according to some embodiments of the present disclosure.

FIG. 1 is a flowchart illustrating an AC barring method according to some embodiments of the present disclosure, and FIG. 2 is an application scene illustrating an AC barring method according to some embodiments of the present disclosure. The AC barring method is applicable to a terminal. As shown in FIG. 1, the AC barring method may include the following steps 110-120.

At step 110, events simultaneously triggered by NAS and AS are detected.

In the embodiments of the present disclosure, the NAS triggered event may be an event triggered by the NAS of the terminal in an inactive state. For example, the NAS triggered event is core network (CN) paging. The AS triggered event may be an event triggered by the AS of the terminal in the inactive state. For example, the AS triggered event is radio access network (RAN) paging.

At step 120, AC barring check is performed on the NAS triggered event and/or the AS triggered event.

In the embodiments of the present disclosure, AC barring check can be performed on both the NAS triggered event and the AS triggered event, or AC barring check can be performed on only one of the NAS triggered event and the AS triggered event.

In some embodiments, the AS triggered event is RAN paging and the step 120 may be executed in a way that the step 120 includes but is not limited to:

(1-1) performing AC barring check on both the NAS triggered event and the RAN paging; or (1-2) performing AC barring check on the RAN paging after AC barring check is performed on the NAS triggered event and it is detected that the terminal enters a connected state; or (1-3) performing AC barring check on the RAN paging but not on the NAS triggered event; or (1-4) performing AC barring check only on the NAS triggered event but not on the RAN paging.

The application scene shown in FIG. 2 includes a terminal and a base station.

In response to detecting events simultaneously triggered by NAS and AS, the terminal may perform AC barring check on the NAS triggered event and/or the AS triggered event. Especially if the AS triggered event is RAN paging, that is, when the AS of the terminal needs to send a resume request to the base station, the terminal may perform AC barring check on both the NAS triggered event and the RAN paging; the terminal may perform AC barring check on the RAN paging after AC barring check on the NAS triggered event is performed and it is detected that the terminal enters the connected state; or the terminal may perform AC barring check only on the RAN paging but not on the NAS triggered event; or the terminal may perform AC barring check only on the RAN paging but not on the NAS triggered event.

It can be seen from the above embodiment that when events simultaneously triggered by NAS and AS are detected, AC barring check can be performed on the NAS triggered event and/or the AS triggered event, thereby realizing AC barring for concurrent events and expanding the application range of AC barring.

Figure 3:
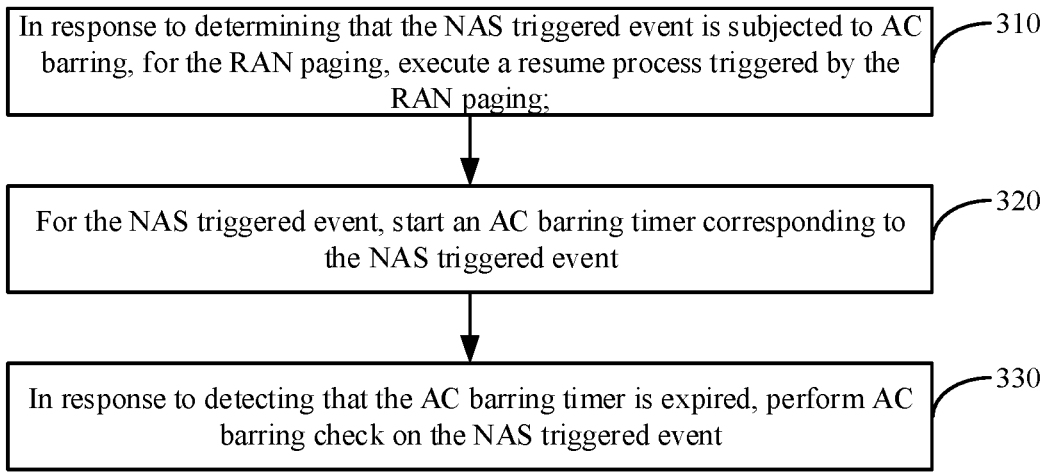
FIG. 3 is a flowchart illustrating another AC barring method according to some embodiments of the present disclosure.

FIG. 3 is a flowchart illustrating another AC barring method according to some embodiments of the present disclosure. The AC barring method is applicable to a terminal, and on the basis of the method shown in FIG. 1, in some embodiments, the AS triggered event is RAN paging. Upon performing AC barring check on both the NAS triggered event and the RAN paging in step 120, as shown in FIG. 3, the following steps 310-330 may be included.

At step 310, in response to determining that the NAS triggered event is subjected to AC barring, a resume process triggered by the RAN paging is executed for the RAN paging.

In the embodiments of the present disclosure, in response to determining that the NAS triggered event is subjected to AC barring, the terminal can only access the network in response to the RAN paging, and none NAS message is carried in a radio resource control (RRC) message during the process of network accessing. The RRC message may be an RRC connection resume complete message, that is, message 5 (msg5).

At step 320, for the NAS triggered event, an AC barring timer corresponding to the NAS triggered event is started.

In the embodiments of the present disclosure, the AC barring timer may be configured by the base station, or negotiated by the terminal and the base station in advance, or determined based on a communication protocol.

At step 330, in response to detecting that the AC barring timer is expired, AC barring check is performed on the NAS triggered event.

In the embodiments of the present disclosure, due to the AC barring timer started for the NAS triggered event, AC barring check may only be performed again on the NAS triggered event after the AC barring timer expires.

In some embodiments, the AC barring timer is not restarted in response to that the RAN paging triggers the terminal to enter the connected state or to be in the inactive state.

In some embodiments, the AC barring timer is reset or restarted in response to that the RAN paging triggers the terminal to enter the connected state or to be in the inactive state. Where, resetting the AC barring timer is to set the AC barring timer to an initial value, but does not cause the AC barring timer to run.

It can be seen from the above embodiment that, for performing AC barring check on both the NAS triggered event and the RAN paging, in response to determining that the NAS triggered event is subjected to AC barring, for the RAN paging, a resume process triggered by the RAN paging may be executed; for the NAS triggered event, an AC barring timer corresponding to the NAS triggered event may be started; and in response to detecting that the AC barring timer is expired, AC barring check is performed on the NAS triggered event. In this way, concurrent events all may be processed and the reliability of AC barring is improved.

Figure 4:
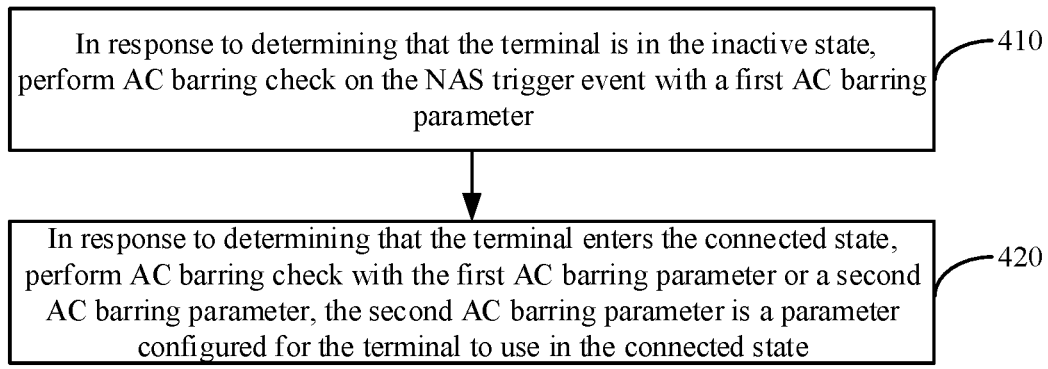
FIG. 4 is a flowchart illustrating another AC barring method according to some embodiments of the present disclosure.

FIG. 4 is a flowchart illustrating another AC barring method according to some embodiments of the present disclosure. The AC barring method is applicable to a terminal, and on the basis of the method shown in FIG. 3, upon performing step 330, as shown in FIG. 4, the following steps 410-420 may be included.

At step 410, in response to determining that the terminal is in the inactive state, AC barring check is performed on the NAS triggered event with a first AC barring parameter. The first AC barring parameter is a parameter configured for the terminal to use in the inactive state.

In the embodiments of the present disclosure, the first AC barring parameter may be configured by the base station, or negotiated by the terminal and the base station in advance, or determined based on a communication protocol.

If the terminal is still in the inactive state, the AC barring check may be continued with the first AC barring parameter corresponding to the NAS triggered event which is configured for the terminal to use in the inactive state.

At step 420, in response to determining that the terminal enters the connected state, AC barring check is performed with the first AC barring parameter or a second AC barring parameter. The second AC barring parameter is a parameter configured for the terminal to use in the connected state.

In the embodiments of the present disclosure, the second AC barring parameter may be configured by the base station, or negotiated by the terminal and the base station in advance, or determined based on a communication protocol.

If the terminal enters the connected state, the AC barring check may be continued with the first AC barring parameter corresponding to the NAS triggered event which is configured for the terminal to use in the inactive state, or with the second AC barring parameter corresponding to the NAS triggered event which is configured for the terminal to use in the connected state.

As for how the terminal determines whether to use the first AC barring parameter to perform the AC barring check or to use the second AC barring parameter to perform the AC barring check, it may include but not limited to the following two ways:

The first way: determine according to whether the second AC barring parameter sent by the base station is received.

In this way, the determination process may include:

(2-1) If the second AC barring parameter sent by the base station is received, performing the AC barring check with the second AC barring parameter.

(2-2) If the second AC barring parameter sent by the base station is not received, performing the AC barring check with the first AC barring parameter.

For example, if the base station configures the terminal to enter the connected state and carries the second AC barring parameter corresponding to the NAS triggered event for the terminal to use in connected state through a dedicated signaling at the same time, the AC barring check on the NAS triggered event of the terminal may be performed with the second AC barring parameter corresponding to the NAS triggered event which is configured for the terminal to use in the connected state; otherwise, the AC barring check may be continued with the first AC barring parameter corresponding to the NAS triggered event which is configured for the terminal to use in the inactive state.

The second way: determine according to whether indication information, sent by the base station, for instructing the terminal to use the second AC barring parameter is received. The second AC barring parameter is a parameter configured for the terminal to use in the connected state.

In this way, the determination process may include:

(3-1) If the indication information, sent by the base station, for instructing the terminal to use the second AC barring parameter is received, performing the AC barring check with the second AC barring parameter based on the indication information.

(3-2) If the indication information sent by the base station is not received, performing the AC barring check with the first AC barring parameter.

For example: if the network configures the terminal to enter the connected state and carries the indication information for instructing the terminal to use the second AC barring parameter in the connected state through a dedicated signaling, the AC barring check on the NAS triggered event of the terminal may be performed with the second AC barring parameter corresponding to the NAS triggered event which is configured for the terminal to use in the connected state; otherwise, the AC barring check may be continued with the first AC barring parameter corresponding to the NAS triggered event which is configured for the terminal to use in the inactive state.

It can be seen from the above embodiment that in response to determining that the terminal is in the inactive state, AC barring check may be performed on the NAS triggered event with the first AC barring parameter. The first AC barring parameter is a parameter configured for the terminal to use in the inactive state. In response to determining that the terminal enters the connected state, the AC barring check may be performed with the first AC barring parameter or the second AC barring parameter. The second AC barring parameter is a parameter configured for the terminal to use in the connected state. As such, the accuracy of AC barring check is improved.

Figure 5:
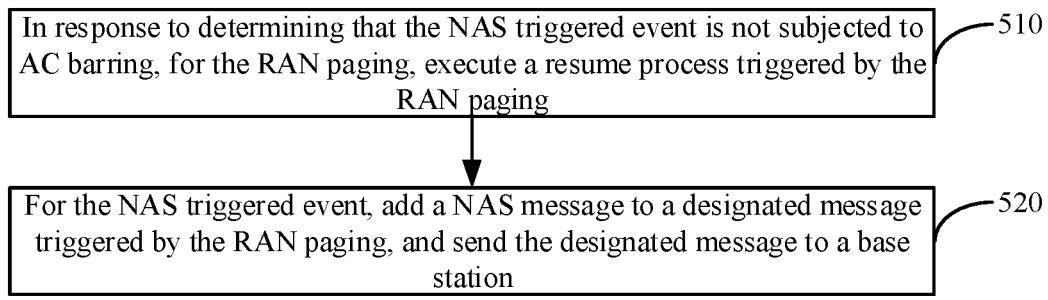
FIG. 5 is a flowchart illustrating another AC barring method according to some embodiments of the present disclosure.

FIG. 5 is a flowchart illustrating another AC barring method according to some embodiments of the present disclosure. The AC barring method is applicable to a terminal, and on the basis of the method shown in FIG. 1, in some embodiments, the AS triggered event is RAN paging. Upon performing AC barring check on both the NAS triggered event and the RAN paging in step 120, as shown in FIG. 5, the following steps 510-520 may be included.

At step 510, in response to determining that the NAS triggered event is not subjected to AC barring, for the RAN paging, a resume process triggered by the RAN paging is executed.

In the embodiments of the present disclosure, in response to determining that the NAS triggered event is not subjected to AC barring, not only the terminal can access the network in response to the RAN paging, but also a NAS message can be carried in an RRC message during the process of network access. The RRC message may be an RRC connection resume complete message, that is, message 5 (msg5).

At step 520, for the NAS triggered event, the NAS message is added to a designated message triggered by the RAN paging, and the designated message is sent to the base station.

In the embodiments of the present disclosure, one or more designated messages can be triggered by the RAN paging, and the terminal may determine to which one of the designated messages to add the NAS message according to the actual situation.

In some embodiments, the designated message is an RRC message during the resume process triggered by the RAN paging or an uplink message from the terminal when the terminal is triggered by the RAN paging to enter the connected state. The RRC message may be an RRC connection resume complete message, that is, message 5 (msg5).

It can be seen from the above embodiment that upon performing AC barring check on the NAS triggered event and the RAN paging both, in response to determining that the NAS triggered event is not subjected to AC barring, for the RAN paging, a resume process triggered by the RAN paging is executed, and for the NAS triggered event, a NAS message is added to a designated message triggered by the RAN paging and the designated message is sent to the base station. As such, the accuracy of AC barring is improved.

Figure 6:
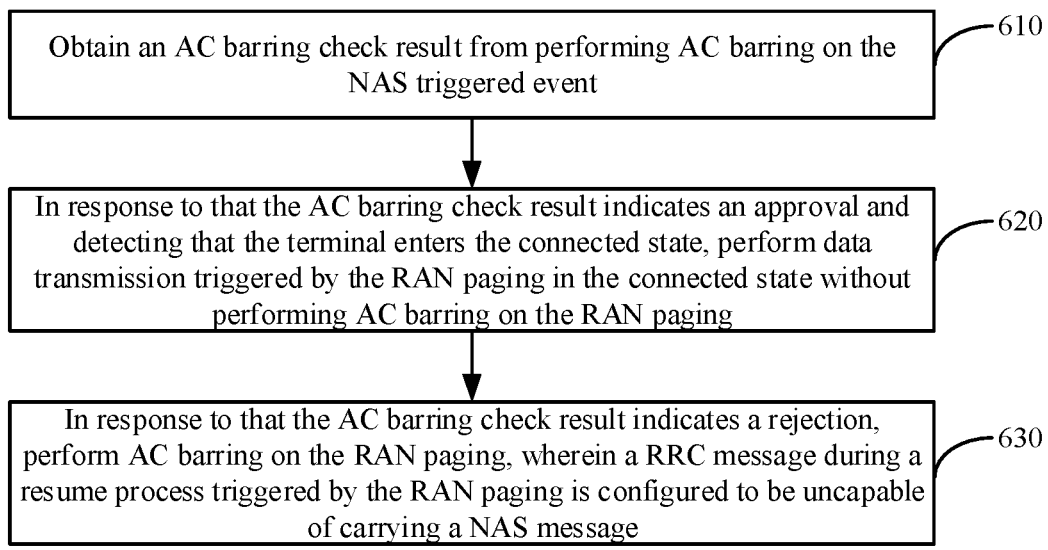
FIG. 6 is a flowchart illustrating another AC barring method according to some embodiments of the present disclosure.

FIG. 6 is a flowchart illustrating another AC barring method according to some embodiments of the present disclosure. The AC barring method is applicable to a terminal, and on the basis of the method shown in FIG. 1, in some embodiments, the AS triggered event is RAN paging. Upon performing AC barring check on the RAN paging after AC barring check is performed on the NAS triggered event and it is detected that the terminal enters the connected state in step 120, as shown in FIG. 6, the following steps 610-630 may be included.

At step 610, after performing AC barring check on the NAS triggered event, an AC barring check result is obtained.

In the embodiments of the present disclosure, the AC barring check result may indicate an approval, or may be a rejection.

For example, AC barring check on the NAS triggered event is performed first, and the terminal which passes AC barring for the NAS triggered event enters the connected state with a configuration of the network. Then the data transmission triggered by the RAN paging may be performed in the connected state, and there is no need to trigger AC barring check on the RAN paging at this time.

For another example, AC barring check on the NAS triggered event is performed first, and the terminal which does not pass AC barring check for the NAS triggered event further performs AC barring check on the RAN paging. At this time, a NAS message cannot be carried in an RRC message during a resume process triggered by the RAN paging.

At step 620, in response to that the AC barring check result indicates an approval and detecting that the terminal enters the connected state, the data transmission triggered by the RAN paging is performed in the connected state without performing AC barring check on the RAN paging.

At step 630, in response to that the AC barring check result indicates a rejection, AC barring check is performed on the RAN paging, and the RRC message during the resume process triggered by the RAN paging cannot be used to carry the NAS message.

It can be seen from the above embodiment that, when concurrent events are processed in sequence, an AC barring check result can be obtained from performing AC barring check on the NAS triggered event; in response to that the AC barring check result indicates an approval and detecting that the terminal enters the connected state, the data transmission triggered by the RAN paging is performed in the connected state without performing AC barring check on the RAN paging; and in response to that the AC barring check result indicates a rejection, AC barring check is performed on the RAN paging, and the RRC message during the resume process triggered by the RAN paging cannot be used to carry the NAS message. As such, the efficiency and the flexibility of AC barring are improved.

Figure 7:
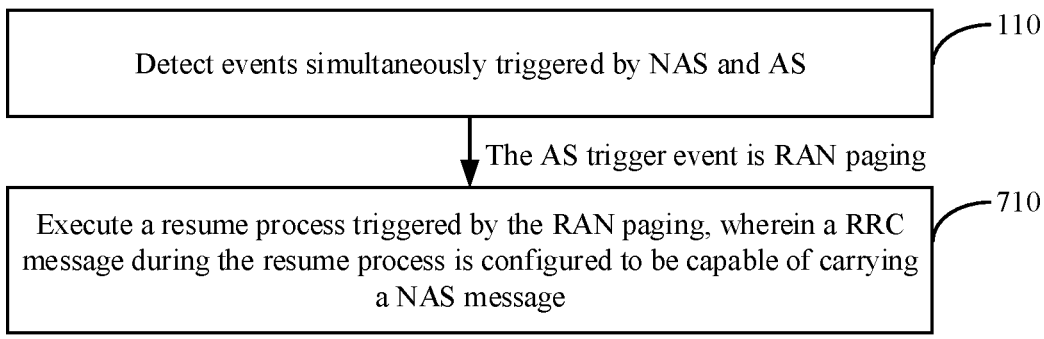
FIG. 7 is a flowchart illustrating another AC barring method according to some embodiments of the present disclosure.

FIG. 7 is a flowchart illustrating another AC barring method according to some embodiments of the present disclosure. The AC barring method is applicable to a terminal, and on the basis of the method shown in FIG. 1, in some embodiments, the AS triggered event is RAN paging. Upon performing AC barring only on the RAN paging but not on the NAS triggered event in step 120, as shown in FIG. 7, the following step 710 may be included.

At step 710, a resume process triggered by the RAN paging is executed, where an RRC message during the resume process can be used to carry the NAS message.

In the embodiments of the present disclosure, if AC barring check is only performed on the RAN paging, AC barring cannot be performed such that a resume process triggered by the RAN paging is directly executed. In addition, the NAS message can be carried in the RRC message during the resume process, that is, AC barring on NAS triggered event is no longer need to be performed.

It can be seen from the above embodiment that upon performing AC barring only on the RAN paging but not on the NAS triggered event, the RAN paging may be not subjected to AC barring and the resume process triggered by the RAN paging may be executed, with the RRC message during the resume process being capable of carrying the NAS message. As such, only one of the concurrent events is processed and the efficiency of AC barring is improved.

Figure 8:
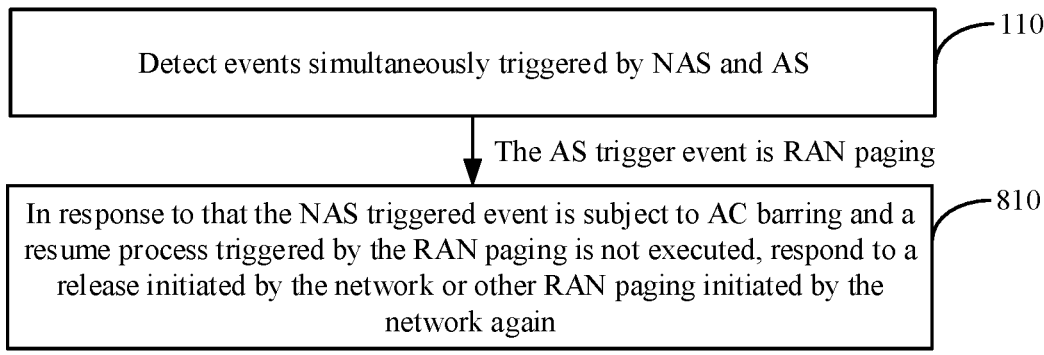
FIG. 8 is a flowchart illustrating another AC barring method according to some embodiments of the present disclosure.

FIG. 8 is a flowchart illustrating another AC barring method according to some embodiments of the present disclosure. The AC barring method is applicable to a terminal, and on the basis of the method shown in FIG. 1, in some embodiments, the AS triggered event is RAN paging. Upon performing AC barring only on the NAS triggered event but not on the RAN paging in step 120, as shown in FIG. 8, the following step 810 may be included.

At step 810, after AC barring check is performed on the NAS triggered event and a resume process triggered by the RAN paging is not executed, a release initiated by the network is responded to or the RAN paging initiated again by the network is responded to.

It can be seen from the above embodiment that upon performing AC barring check only on the NAS triggered event but not on the RAN paging, after AC barring check is performed on the NAS triggered event and a resume process triggered by the RAN paging is not executed, a release initiated by the network is responded to or the RAN paging initiated again by the network is responded to. As such, only one of the concurrent events is processed and the efficiency of the AC barring is improved.

Figure 9:
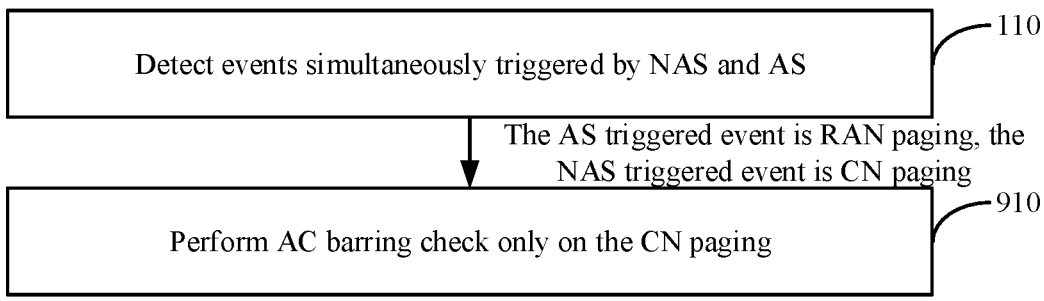
FIG. 9 is a flowchart illustrating another AC barring method according to some embodiments of the present disclosure.

FIG. 9 is a flowchart illustrating another AC barring method according to some embodiments of the present disclosure. The AC barring method is applicable to a terminal, and on the basis of the method shown in FIG. 1, the AS triggered event is RAN paging, and the NAS triggered event is CN paging. Upon performing step 120, as shown in FIG. 9, the following step 910 may be included.

At step 910, AC barring is performed only on CN paging.

It can be seen from the above embodiment that when the AS triggered event is RAN paging and the NAS triggered event is CN paging, AC barring may be performed only on the CN paging. As such, the accuracy and efficiency of AC barring are improved.

Corresponding to the aforementioned examples of AC barring methods, the present disclosure also provides examples of AC barring apparatuses.

Figure 10:
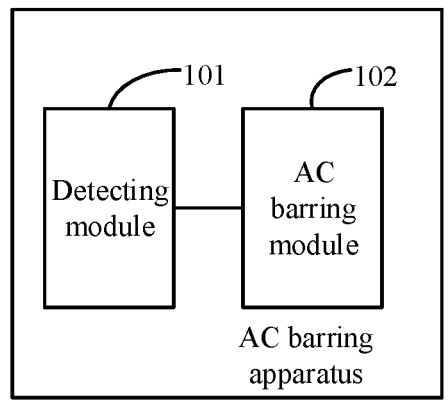
FIG. 10 is a block diagram illustrating an AC barring apparatus according to some embodiments of the present disclosure.

FIG. 10 is a block diagram illustrating an AC barring apparatus according to some embodiments of the present disclosure. The apparatus is applicable to a terminal and configured to execute the AC barring method shown in FIG. 1. As shown in FIG. 10, the apparatus may include:

a detecting module 101, configured to detect events simultaneously triggered by NAS and AS;

an AC barring module 102, configured to perform AC barring check on the NAS triggered event and/or the AS triggered event.

It can be seen from the above embodiment that when events simultaneously triggered by NAS and AS are detected, AC barring check can be performed on the NAS triggered event and/or the AS triggered event, thereby realizing AC barring for concurrent events and expanding the application range of AC barring.

Figure 11:
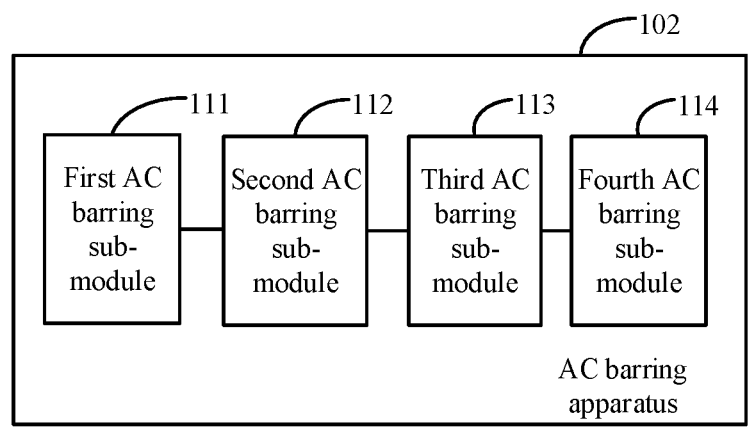
FIG. 11 is a block diagram illustrating another AC barring apparatus according to some embodiments of the present disclosure.

In some embodiments, on the basis of the apparatus shown in FIG. 10, the AS triggered event is RAN paging. As shown in FIG. 11, the AC barring module 102 may include:

a first AC barring sub-module 111, configured to perform AC barring check on both the NAS triggered event and the RAN paging; or a second AC barring sub-module 112, configured to, in response to that AC barring check is performed on the NAS triggered event and detecting that the terminal enters a connected state, perform AC barring on the RAN paging; or a third AC barring sub-module 113, configured to perform AC barring check only on the RAN paging but not on the NAS triggered event; or a fourth AC barring sub-module 114, configured to perform the AC barring check only on the NAS triggered event but not on the RAN paging.

Figure 12:
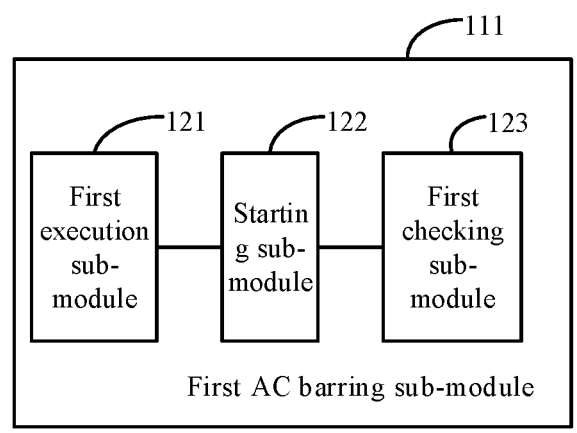
FIG. 12 is a block diagram illustrating another AC barring apparatus according to some embodiments of the present disclosure.

In some embodiments, on the basis of the apparatus shown in FIG. 11, as shown in FIG. 12, the first AC barring sub-module 111 may include:

a first execution sub-module 121, configured to, in response to determining that the NAS triggered event is subjected to AC barring, for the RAN paging, execute a resume process triggered by the RAN paging;

a starting sub-module 122, configured to, for the NAS triggered event, start an AC barring timer corresponding to the NAS triggered event;

a first checking sub-module 123, configured to, in response to detecting that the AC barring timer is expired, perform AC barring check on the NAS triggered event again.

It can be seen from the above embodiment that, for performing AC barring on both the NAS triggered event and the RAN paging, in response to determining that the NAS triggered event is subjected to AC barring, for the RAN paging, a resume process triggered by the RAN paging may be executed; for the NAS triggered event, an AC barring timer corresponding to the NAS triggered event may be started; and in response to detecting that the AC barring timer is expired, AC barring check is performed on the NAS triggered event. In this way, concurrent events may be processed and the reliability of AC barring is improved.

In some embodiments, on the basis of the apparatus shown in FIG. 12, the AC barring timer is not restarted after the RAN paging triggers the terminal to enter the connected state or to be in the inactive state.

In some embodiments, on the basis of the apparatus shown in FIG. 12, the AC barring timer is reset or restarted after the RAN paging triggers the terminal to enter the connected state or to be in the inactive state.

Figure 13:
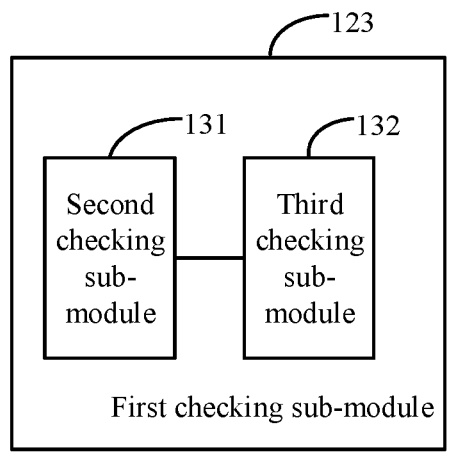
FIG. 13 is a block diagram illustrating another AC barring apparatus according to some embodiments of the present disclosure.

In some embodiments, on the basis of the apparatus shown in FIG. 12, as shown in FIG. 13, the first checking sub-module 123 may include:

a second checking sub-module 131, configured to, in response to determining that the terminal is in the inactive state, perform AC barring check on the NAS triggered event with a first AC barring parameter. The first AC barring parameter is a parameter configured for the terminal to use in the inactive state;

a third checking sub-module 132, configured to. in response to determining that the terminal enters the connected state, perform AC barring check with the first AC barring parameter or a second AC barring parameter. The second AC barring parameter is a parameter configured for the terminal to use in the connected state.

It can be seen from the above embodiment that in response to determining that the terminal is in the inactive state, AC barring check may be performed on the NAS triggered event with the first AC barring parameter. The first AC barring parameter is a parameter configured for the terminal to use in the inactive state. In response to determining that the terminal enters the connected state, the AC barring check may be performed with the first AC barring parameter or the second AC barring parameter. The second AC barring parameter is a parameter configured for the terminal to use in the connected state. As such, the accuracy of AC barring check is improved.

Figure 14:
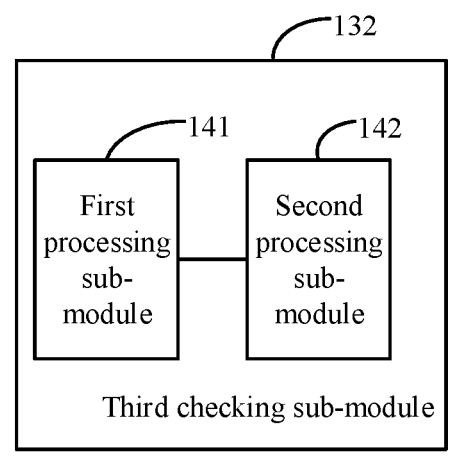
FIG. 14 is a block diagram illustrating another AC barring apparatus according to some embodiments of the present disclosure.

In some embodiments, on the basis of the apparatus shown in FIG. 13, as shown in FIG. 14, the third checking sub-module 132 may include:

a first processing sub-module 141, configured to, in response to receiving the second AC barring parameter from a base station, perform AC barring check with the second AC barring parameter;

a second processing sub-module 141, configured to, in response to not receiving the second AC barring parameter from the base station, perform AC barring check with the first AC barring parameter.

Figure 15:
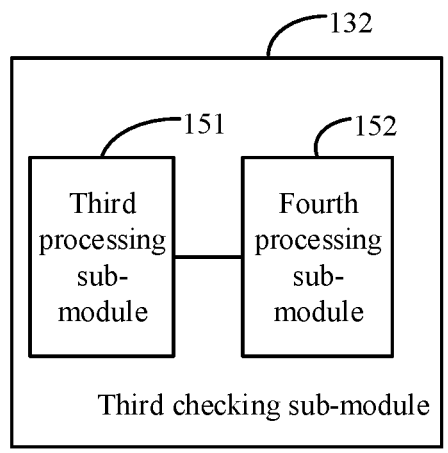
FIG. 15 is a block diagram illustrating another AC barring apparatus according to some embodiments of the present disclosure.

In some embodiments, on the basis of the apparatus shown in FIG. 13, as shown in FIG. 15, the third checking sub-module 132 may include:

a third processing sub-module 151, configured to, in response to receiving, from a base station, indication information which instructs the terminal to use the second AC barring parameter, perform AC barring check with the second AC barring parameter based on the indication information;

a fourth processing sub-module 152, configured to, in response to not receiving the indication information from the base station, perform AC barring check with the first AC barring parameter.

Figure 16:
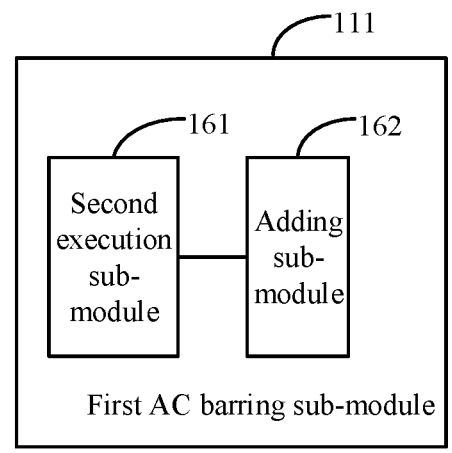
FIG. 16 is a block diagram illustrating another AC barring apparatus according to some embodiments of the present disclosure.

In some embodiments, on the basis of the apparatus shown in FIG. 11, as shown in FIG. 16, the first AC barring sub-module 111 may include:

a second execution sub-module 161 configured to, in response to determining that the NAS triggered event is not subjected to AC barring, for the RAN paging, execute a resume process triggered by the RAN paging;

an adding sub-module 162, configured to, for the NAS triggered event, add a NAS message to a designated message triggered by the RAN paging, and send the designated message to the base station.

It can be seen from the above embodiment that upon performing AC barring check on both the NAS triggered event and the RAN paging, in response to determining that the NAS triggered event is not subjected to AC barring, for the RAN paging, a resume process triggered by the RAN paging is executed, and for the NAS triggered event, a NAS message is added to a designated message triggered by the RAN paging and the designated message is sent to the base station. As such, the accuracy of AC barring is improved.

In some embodiments, on the basis of the apparatus shown in FIG. 16, the designated message is an RRC message during the resume process triggered by the RAN paging, or an uplink message from the terminal when the terminal is triggered to enter the connected state by the RAN paging.

Figure 17:
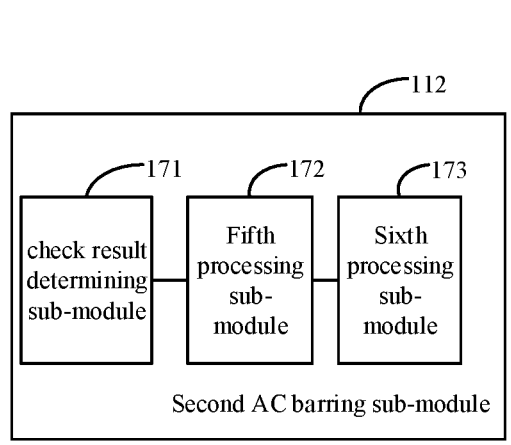
FIG. 17 is a block diagram illustrating another AC barring apparatus according to some embodiments of the present disclosure.

In some embodiments, on the basis of the apparatus shown in FIG. 11, as shown in FIG. 17, the second AC barring sub-module 112 may include:

a check result determining sub-module 171, configured to obtain an AC barring check result from performing AC barring check on the NAS triggered event;

a fifth processing sub-module 172, configured to, in response to that the AC barring check result indicates an approval and detecting that the terminal enters the connected state, perform data transmission triggered by the RAN paging in the connected state without performing AC barring check on the RAN paging;

a sixth processing sub-module 173, configured to, in response to that the AC barring check result indicates a rejection, perform AC barring check on the RAN paging, wherein an RRC message during a resume process triggered by the RAN paging is configured to be uncapable of carrying a NAS message.

It can be seen from the above embodiment that, when concurrent events are processed in sequence, an AC barring check result can be obtained from performing AC barring check on the NAS triggered event; in response to that the AC barring check result indicates an approval and detecting that the terminal enters the connected state, the data transmission triggered by the RAN paging is performed in the connected state without performing AC barring check on the RAN paging; and in response to that the AC barring check result indicates a rejection, AC barring check is performed on the RAN paging, and the RRC message during the resume process triggered by the RAN paging cannot be used to carry the NAS message. As such, the efficiency and the flexibility of AC barring are improved.

Figure 18:
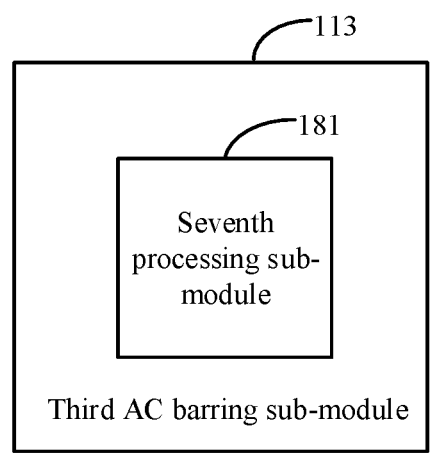
FIG. 18 is a block diagram illustrating another AC barring apparatus according to some embodiments of the present disclosure.

In some embodiments, on the basis of the apparatus shown in FIG. 11, as shown in FIG. 18, the third AC barring sub-module 112 may include:

a seventh processing sub-module 181, configured to execute a resume process triggered by the RAN paging without performing AC barring check on the RAN paging, wherein an RRC message during the resume process is configured to be capable of carrying a NAS message.

It can be seen from the above embodiment that upon performing AC barring check only on the RAN paging but not on the NAS triggered event, the resume process triggered by the RAN paging may be executed, with the RRC message during the resume process being capable of carrying the NAS message. As such, only one of the concurrent events is processed and the efficiency of AC barring is improved.

Figure 19:
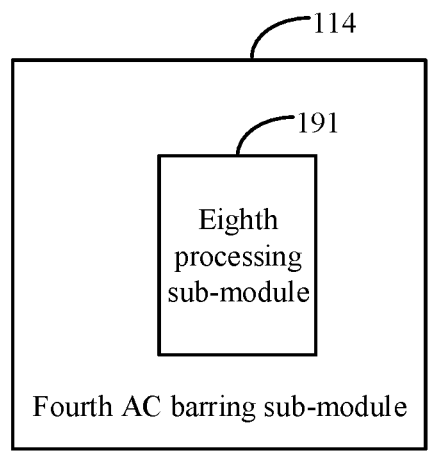
FIG. 19 is a block diagram illustrating another AC barring apparatus according to some embodiments of the present disclosure.

In some embodiments, on the basis of the apparatus shown in FIG. 11, as shown in FIG. 19, the fourth AC barring sub-module 112 may include:

an eighth processing sub-module 191, configured to, in response to that the NAS triggered event is subject to AC barring check and a resume process triggered by the RAN paging is not executed, respond to a release initiated by the network or other RAN paging initiated by the network again.

It can be seen from the above embodiment that upon performing AC barring check only on the NAS triggered event but not on the RAN paging, after AC barring check is performed on the NAS triggered event and a resume process triggered by the RAN paging is not executed, a release initiated by the network is responded to or the RAN paging initiated again by the network is responded to. As such, only one of the concurrent events is processed and the efficiency of the AC barring is improved.

Figure 20:
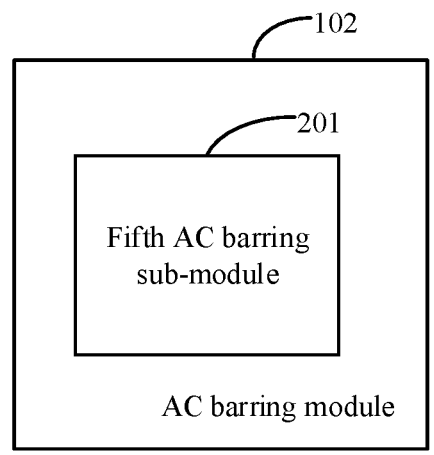
FIG. 20 is a block diagram illustrating another AC barring apparatus according to some embodiments of the present disclosure.

In some embodiments, on the basis of the apparatus shown in FIG. 10, the AS triggered event is RAN paging, and the NAS triggered event is CN paging. As shown in FIG. 20, the AC barring module 102 may include:

a fifth AC barring sub-module 201, configured to perform the AC barring only on CN paging.

It can be seen from the above embodiment that when the AS triggered event is RAN paging and the NAS triggered event is CN paging, AC barring may be performed only on the CN paging. As such, the accuracy and efficiency of AC barring are improved.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions of the present disclosure. Those of ordinary skill in the art may understand and carry out them without creative work.

The present disclosure also provides a non-transitory computer-readable storage medium storing computer program, the computer program is configured to execute the AC barring method described according to any of FIG. 1 to FIG. 9.

Various embodiments of the present disclosure also provide an AC barring apparatus, the apparatus is applicable to a terminal and includes:

a processor;

memory for storing executable instructions by the processor;

wherein, the processor is configured to:

detect at least one of a NAS triggered event and an AS triggered event;

perform an AC barring check on at least one of the NAS triggered event and the AS triggered event.

Figure 21:
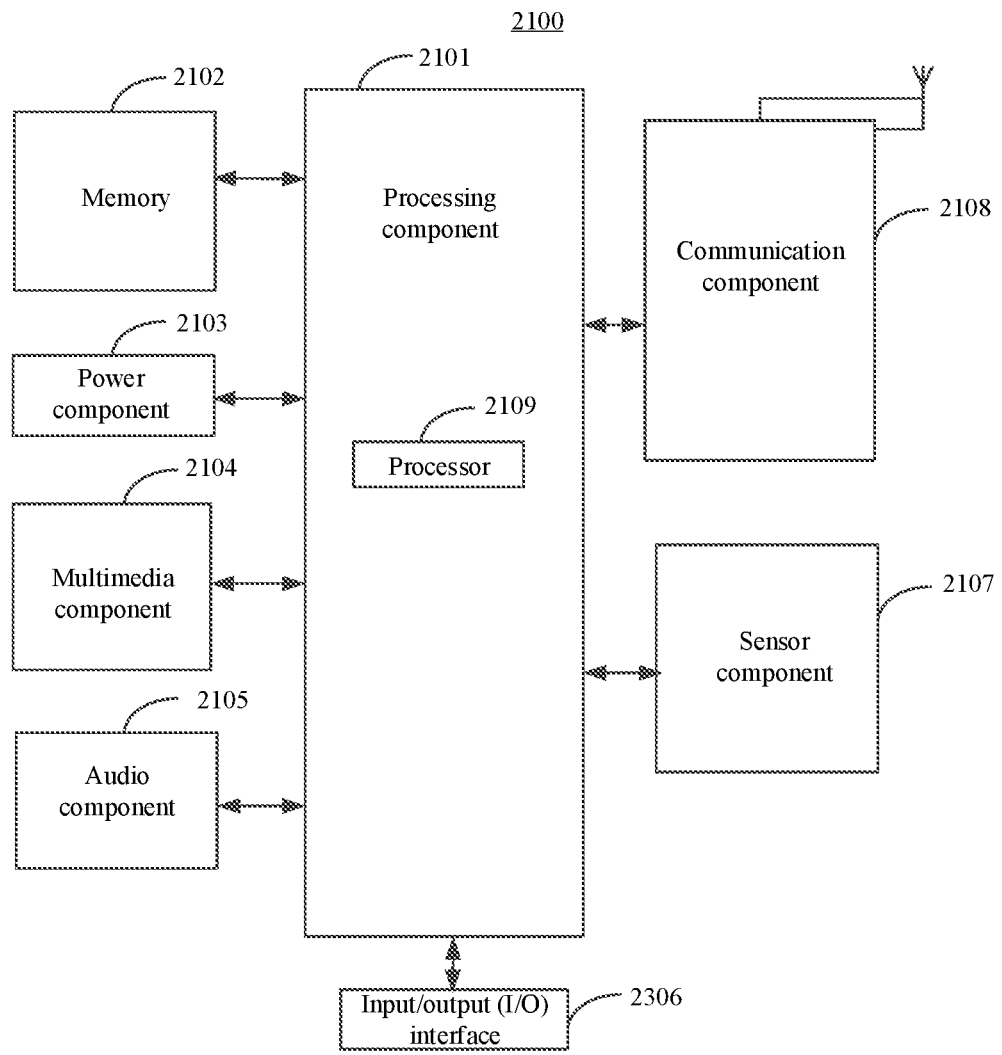
FIG. 21 is a structural schematic diagram illustrating an AC barring apparatus according to some embodiments of the present disclosure.

FIG. 21 is a structural schematic diagram illustrating an AC barring apparatus according to some embodiments of the present disclosure. As shown in FIG. 21, an AC barring apparatus 2100 is shown according to some embodiments, the apparatus 2100 can be a computer, a mobile phone, a digital broadcast terminal, a message transmitting and receiving device, a gaming console, a tablet device, a medical device, a fitness device, a personal digital assistant, and the like.

Referring to FIG. 21, device 2100 can include one or more of the following components: processing component 2101, memory 2102, power component 2103, multimedia component 2104, audio component 2105, input/output (I/O) interface 2106, sensor component 2107, and a communication component 2108.

Processing component 2101 typically controls the overall operation of device 2100, such as operations associated with display, telephone calls, data communications, camera operations, and recording operations. Processing component 2101 can include one or more processors 2109 to execute instructions to perform all or part of the steps described above. Moreover, processing component 2101 can include one or more modules to facilitate interaction between component 2101 and other components. For example, processing component 2101 can include a multimedia module to facilitate interaction between multimedia component 2104 and processing component 2101.

Memory 2102 is configured to store various types of data to support operation at device 2100. Examples of such data include instructions for any application or method operating on device 2100, contact data, phone book data, messages, pictures, videos, and the like. The memory 2102 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

Power component 2103 provides power to various components of device 2100. Power component 2103 can include a power management system, one or more power sources, and other components associated with generating, managing, and distributing power for device 2100.

The multimedia component 2104 includes a screen between the device 2100 and the user that provides an output interface. In some examples, the screen can include a liquid crystal display (LCD) and a touch panel (TP). In some embodiments, an organic light-emitting diode (OLED) display can be employed.

If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 2104 includes a front camera and/or a rear camera. When the device 2100 is in an operation mode, such as a shooting mode or a video mode, the front camera and/or the rear camera can receive external multimedia data. Each front and rear camera can be a fixed optical lens system or have focal length and optical zoom capabilities.

The audio component 2105 is configured to output and/or input an audio signal. For example, audio component 2105 includes a microphone (MIC) that is configured to receive an external audio signal when device 2100 is in an operational mode, such as a call mode, a recording mode, and a voice recognition mode. The received audio signal may be further stored in memory 2102 or transmitted via communication component 2108. In some examples, audio component 2105 also includes a speaker for outputting an audio signal.

The I/O interface 2106 may provide interfaces between the processing component 2101 and peripheral interface modules. The peripheral interface modules may include a keyboard, a click wheel, buttons and so on. These buttons may include, but are not limited to, a home button, a volume button, a start button, and a lock button.

Sensor component 2107 includes one or more sensors for providing device 2100 with a status assessment of various aspects. For example, sensor component 2107 can detect an open/closed state of device 2100, a relative positioning of components, such as the display and keypad of device 2100, and sensor component 2107 can also detect a change in position of device 2100 or a component of device 2100, the presence or absence of user contact with device 2100, orientation or acceleration/deceleration of device 2100, and temperature change of device 2100. Sensor component 2107 can include a proximity sensor configured to detect the presence of nearby objects without any physical contact. Sensor component 2107 may also include a light sensor, such as a CMOS or CCD image sensor, for use in imaging applications. In some examples, the sensor component 2107 can also include an acceleration sensor, a gyro sensor, a magnetic sensor, a pressure sensor, or a temperature sensor.

The communication component 2108 is to facilitate wired or wireless communication between the apparatus 2100 and other devices. The device 2100 can access a wireless network based on a communication standard, such as WiFi, 2G or 3G, or a combination thereof. In an exemplary example, communication component 2108 receives broadcast signals or broadcast associated information from an external broadcast management system via a broadcast channel. In an exemplary example, the communication component 2108 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In some embodiments, the apparatus 2100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above and following methods.

In some embodiments, there is also provided a non-transitory computer readable storage medium comprising instructions, such as memory 2102 comprising instructions executable by processor 2109 of device 2100 to perform the above method. For example, the non-transitory computer readable storage medium may be a ROM, a random-access memory (RAM), a CD-ROM, a magnetic tape, a floppy disk, and an optical data storage device.

When the instructions in the storage medium are executed by the processor, the apparatus 2100 can execute any of the AC barring methods in the present disclosure.

Figure 22:
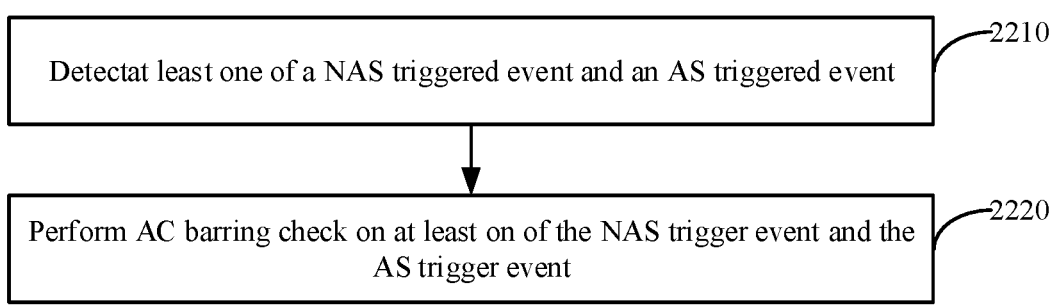
FIG. 22 is a flowchart illustrating another AC barring method according to some embodiments of the present disclosure.

FIG. 22 is a flowchart illustrating an AC barring method according to some embodiments of the present disclosure. The AC barring method is applicable to a terminal. As shown in FIG. 1, the AC barring method may include the following steps 2010-2020.

At step 2210, at least one of a NAS triggered event and an AS triggered event is detected.

At step 2220, AC barring check is performed on the at least one of the NAS triggered event and the AS triggered event.

In some embodiments, the AS triggered event is RAN paging.

In some embodiments, step 2220 includes at least one of the following:

performing AC barring check on both the NAS triggered event and the RAN paging;

in response to that AC barring check is performed on the NAS triggered event and detecting that the terminal enters a connected state, performing AC barring check on the RAN paging;

performing AC barring check only on the RAN paging; and performing AC barring check only on the NAS triggered event.

In some embodiments, performing AC barring check only on the RAN paging includes: allowing for executing a resume process triggered by the RAN paging.

In some embodiments, upon performing AC barring check only on the RAN paging, an RRC message during the resume process is configured to be capable of carrying a NAS message.

In some embodiments, the NAS triggered event is CN paging, performing AC barring check on at least one of the NAS triggered event and the AS triggered event includes: performing AC barring check only on the CN paging.

Various embodiments of the present disclosure can provide one or more of the following advantages.

When a terminal according to some embodiments of the present disclosure detects events simultaneously triggered by NAS and AS in the terminal, the terminal may perform an AC barring on the NAS triggered event and/or the AS triggered event, thereby realizing AC barring for concurrent events and expanding the application range of AC barring.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An access control (AC) barring method, being applicable to a terminal, comprising:

detecting a non-access stratum (NAS) triggered event and an access stratum (AS) triggered event,
wherein the AS triggered event is radio access network (RAN) paging; and
performing AC barring check only on the RAN paging;
wherein the performing AC barring check only on the RAN paging comprises:
allowing for executing a resume process triggered by the RAN paging.

2. The method of claim 1, wherein upon performing AC barring check only on the RAN paging, an RRC message during the resume process is configured to be capable of carrying a NAS message.

3. The method of claim 1, wherein the NAS triggered event is core network (CN) paging.

4. A non-transitory computer readable storage medium storing computer instructions thereon for execution by a processor to cause the processor to perform:
detecting a non-access stratum (NAS) triggered event and an access stratum (AS) triggered event, wherein the AS triggered event is radio access network (RAN) paging; and
performing AC barring check only on the RAN paging, wherein the performing AC barring check only on the RAN paging comprises allowing for executing a resume process triggered by the RAN paging.

5. An Access Control (AC) barring apparatus, being applicable to a terminal, comprising:
a processor;
memory for storing executable instructions by the processor;
wherein, the processor is configured to:
detect a non-access stratum (NAS) triggered event and an access stratum (AS) triggered event; and
perform AC barring check only on the RAN paging, wherein performing AC barring check only on the RAN paging comprises allowing for executing a resume process triggered by the RAN paging.

6. A mobile terminal comprising the AC barring apparatus of claim 5, wherein the mobile terminal is configured to, when detecting events simultaneously triggered by NAS and AS in the mobile terminal, perform AC barring only on the RAN paging, wherein the performing AC barring only on the RAN paging comprises allowing for executing a resume process triggered by the RAN paging, thereby realizing AC barring for concurrent events and expanding application range of AC barring.

7. The mobile terminal of claim 6, further comprising a display screen.

* * * * *